Oct. 30, 1928.

J. A. ANDRUSIS 1,689,471

ILLUMINATED MIRROR, ALBUM, AND CLOCK

Filed Jan. 27, 1928     2 Sheets-Sheet 1

John A. Andrusis,
INVENTOR

BY Victor J. Evans
ATTORNEY

WITNESS:

Oct. 30, 1928.
J. A. ANDRUSIS
1,689,471
ILLUMINATED MIRROR, ALBUM, AND CLOCK
Filed Jan. 27, 1928   2 Sheets-Sheet 2
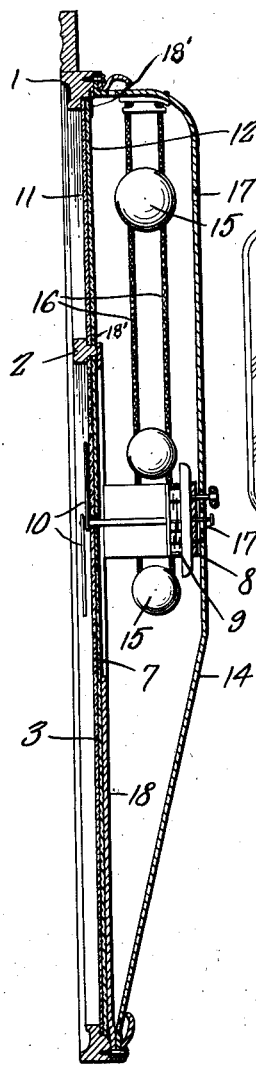
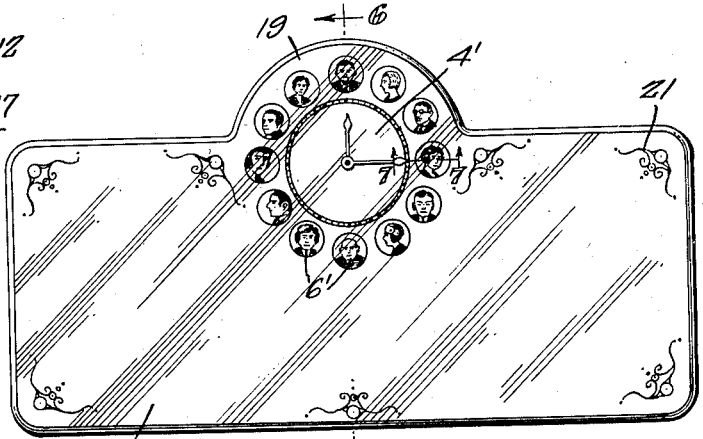
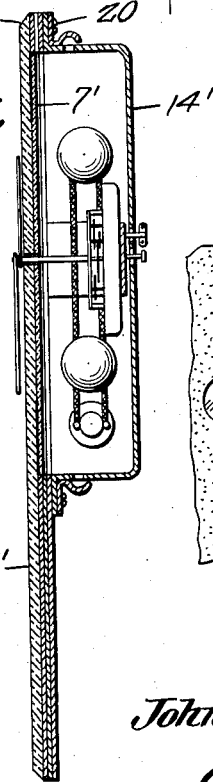
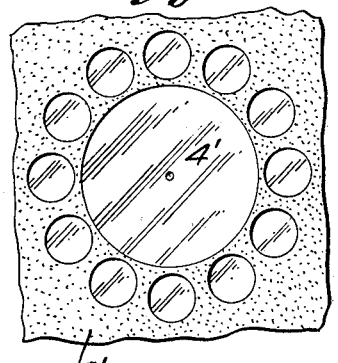
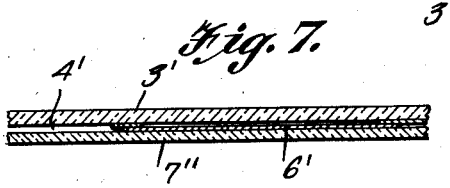
John A. Andrusis,
INVENTOR
BY Victor J. Evans
ATTORNEY
WITNESS:

Patented Oct. 30, 1928.

1,689,471

UNITED STATES PATENT OFFICE.

JOHN A. ANDRUSIS, OF BROOKLYN, NEW YORK.

ILLUMINATED MIRROR, ALBUM, AND CLOCK.

Application filed January 27, 1928. Serial No. 249,977.

This invention relates to an illuminated mirror, album and clock, the general object of the invention being to form the mirror with a clock dial, with photographs or pictures forming an album on the mirror, clock mechanism being supported in rear of the mirror with its hands traveling over the dial, with means for illuminating the pictures and dial from the rear of the mirror to provide an attractive and useful article which can be used as an ordinary mirror, an album and a clock.

A further object of the invention is to make the pictures transparent, preferably by using positive films so that they will be illuminated by the lighting means in the rear of the mirror and to so arrange some of the pictures that they will take the place of the hour numerals on the clock dial.

A further object of the invention is to provide openings in the coating on the rear face of the mirror to receive the positive films containing the pictures and to place a translucent member, preferably of opal glass at the rear of the mirror to cover the pictures so as to make the pictures clearly visible when the lamps at the rear of the device are lighted.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a section on line 3—3 of Figure 1.

Figure 5 is a view showing the invention applied to a mirror without a frame.

Figure 6 is a section on line 6—6 of Figure 5.

Figure 7 is a section on line 7—7 of Figure 5.

Figure 8 is a fragmentary rear view of the mirror, showing how the spaces are formed for the clock face and pictures by removing the silver coating from the rear face of the mirror.

Figure 1:
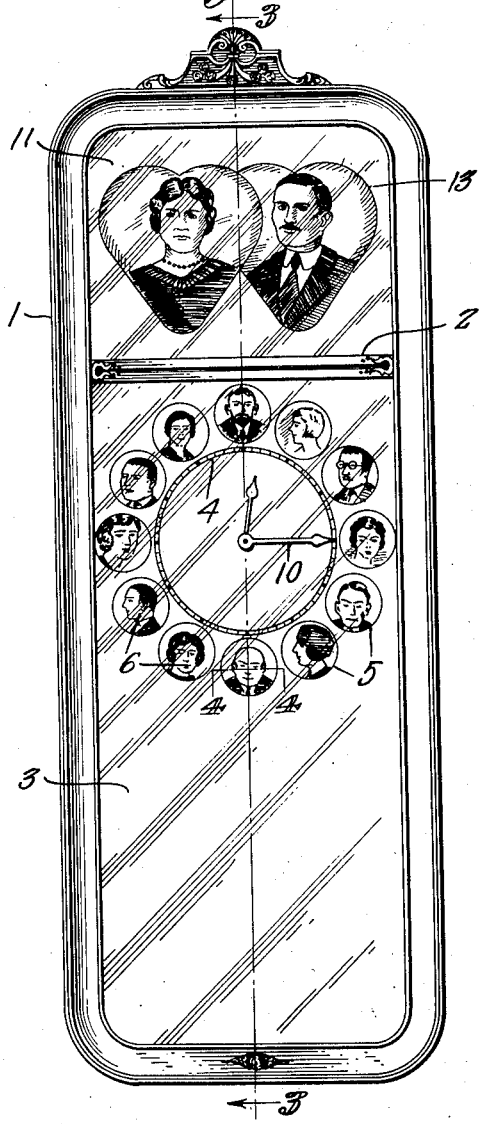
Figure 1 is a front view showing the invention applied to a mirror provided with a frame.
Figure 2:
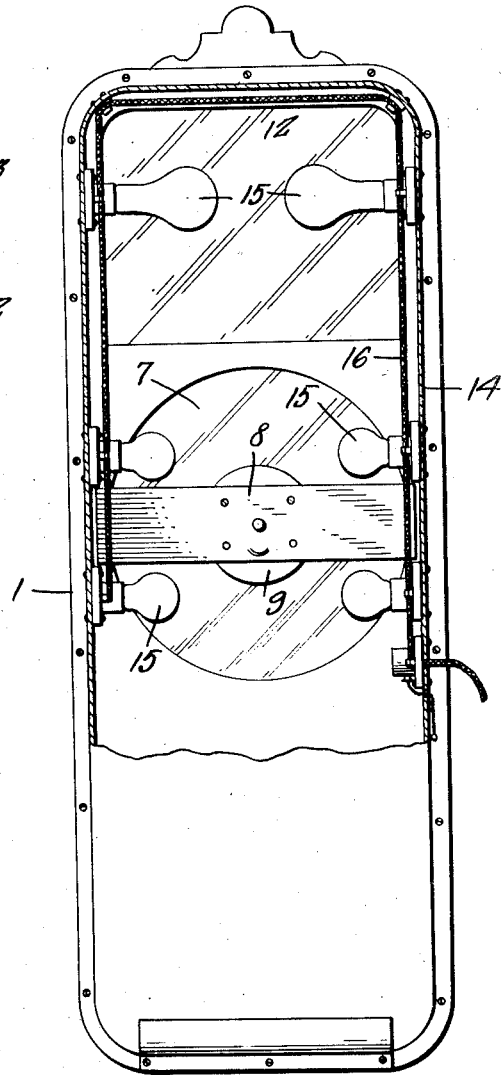
Figure 2 is a rear view of Figure 1, with parts in section.
Figure 4:
Figure 4 is a section on line 4—4 of Figure 1.

Referring to Figures 1, 2, 3 and 4, the numeral 1 indicates a frame which is provided with a cross piece 2 which forms the frame with an upper and lower opening. A mirror 3 is placed in the lower opening and the silver coating on the rear of the mirror is removed to form a ring 4 which has suitably marked thereon the graduations of a clock dial. A row of circles 5 is also formed around the dial by removing the silver coating to form openings through which the photographs or pictures 6 appear, these pictures taking the place of the numerals ordinarily placed on a clock dial. I prefer to print these pictures on positive films which are suitably secured to the rear face of the mirror, with the picture parts appearing through the openings, as shown in Figure 1. A backing plate 7, preferably of opal glass, is placed on the rear face of the mirror in such a position as to cover the dial and the pictures so that the coating 7' on this plate will add to the visibility of the pictures.

A frame 8 is arranged at the rear of the mirror and is suitably attached to the frame thereof and this frame carries the clock mechanism 9 with the arbors thereof extending through holes formed in the backing plate and the mirror so that the hands 10 of the clock which are attached to the arbors will be located in front of the mirror so that they can travel over the dial. These hands are preferably white.

A glass plate 11 is placed in the upper opening of the frame with a backing plate 12 in the rear thereof, this backing plate also being of opal glass and pictures printed on positive films are placed between the two glasses, as shown at 13. If desired, the sensitive medium may be placed on the rear face of the glass 11 so that the pictures will be carried directly by said plate.

A casing 14 is fastened to the rear of the frame and encloses the rear portions of the plates and electric lamps 15 are carried by the casing for illuminating the pictures and the clock dial when the lamps are lighted. The conductors for these lamps are shown at 16. The rear of the casing is provided with holes 17 for ventilating purposes and some of these holes have the winding and other stems of the clock mechanism passing therethrough. The inner walls of the casing are made reflective so that the rays of light will be directed through the translucent parts of the device. A backing plate 18 is placed on the lower part of the mirror, this plate being preferably of tin, and tin or other non-inflammable material 18′ should be placed over the edges of the plates 11 and 12 which have the films between them so as to reduce the fire hazards and prevent heat or flames from reaching the films.

In the modification shown in Figures 5, 6, 7 and 8, the mirror 3′ is not used with a frame and a large circle is formed on the mirror by removing the silver coating therefrom to form the clock dial 4′ so that when the backing plate 7″ is put in place, the entire clock dial will be translucent instead of the ring carrying the graduations being translucent as in the first form of the invention. This mirror is also formed with the row of circles for the photographs or pictures 6′, the clock dial with its outer row of circles being arranged on the upper central part of the mirror which is provided with a semi-circular part 19 at the center of its upper edge to receive portions of the row of circles and portions of the dial. The casing 14′ at the rear of the mirror is attached to the rear face of the mirror by the screws 20 which pass through holes in the mirror and the front face of the mirror may be engraved, as shown at 21, adjacent these holes. In other respects, this form of the invention is similar to that first described, but the casing 14′ need not cover the entire rear part of the mirror, but only the upper part thereof, as shown in Figure 6.

From the foregoing it will be seen that I have provided a mirror which may be used in the ordinary manner and which has associated therewith a clock and photographs or pictures constituting an album, with means for illuminating the pictures in the dial of the clock so as to provide a very attractive device. The pictures are arranged around the dial of the clock to take the place of the hour numerals and in the form of the invention shown in Figure 1, other photographs or pictures are placed in the frame above the mirror and these pictures may be very much larger than the pictures located around the dial. By using opal glass as a backing member, the pictures are made clearly visible and this backing plate provides a translucent member through which the rays of light from the lamps pass so that the pictures and the dial are illuminated with a soft light.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A device of the class described comprising a mirror having openings formed therein by removing portions of the coating, one of these openings forming a clock dial, pictures placed in the other openings, a clock attached to the mirror and having its arbors passing through the dial portion thereof with the hands on the arbors arranged in front of the dial part and means at the rear of the mirror for illuminating the dial and pictures.

2. A device of the class described comprising a mirror having openings formed therein by removing portions of the coating, one of these openings forming a clock dial, pictures placed in the other openings, a clock attached to the mirror and having its arbors passing through the dial portion thereof with the hands on the arbors arranged in front of the dial part, means at the rear of the mirror for illuminating the dial and pictures, said pictures being printed on positive films and a translucent member forming a backing for the picture carrying part of the mirror.

3. A device of the class described comprising a mirror having portions of its coating removed to form a clock dial and an annular row of circular openings around the dial, pictures on positive films placed in the circular openings, the pictures taking the place of the dial numbers, a clock supported from the rear of the mirror and having its arbors passing through a hole formed in the center of the dial with the hands arranged in front of the dial part, a backing member of opal glass covering the pictures and the dial, a casing connected with the rear of the mirror and lamps in the casing for illuminating the pictures and dial.

4. A device of the class described comprising a frame having a cross piece therein dividing the same into upper and lower openings, a mirror in the lower opening having portions of its coating removed to form a clock dial and an annular row of circles around the dial, films carrying positive pictures placed in the circular openings, such pictures taking the place of the dial numbers, a clock supported from the rear of the frame and having its arbors passing through a hole in the center of the dial with the hands on the arbors arranged in front of the dial, a plate of transparent material placed in the upper opening, pictures at the rear of said plate, backing plates for the last mentioned plate and the picture carrying part of the mirror of opal glass, a casing attached to the rear part of the frame and electric lamps in the casing for illuminating the pictures and dial on the mirror and the pictures at the top of the frame.

In testimony whereof I affix my signature.

JOHN A. ANDRUSIS.